(12) United States Patent  (10) Patent No.: US 7,777,983 B2
Brady et al.  (45) Date of Patent: Aug. 17, 2010

(54) APPARATUS AND METHOD FOR GENERATING A SERVO PATTERN

(75) Inventors: Keith Rowland Charles Brady, Fareham (GB); Alistair Malcolm Campbell, Southsea (GB); Mark John Newland, Southsea (GB)

(73) Assignee: Xyratex Technology Limited, Havant (GB)

( * ) Notice: Subject to any disclaimer, the term of this patent is extended or adjusted under 35 U.S.C. 154(b) by 42 days.

(21) Appl. No.: 12/066,761

(22) PCT Filed: Sep. 14, 2006

(86) PCT No.: PCT/GB2006/003414

§ 371 (c)(1),
(2), (4) Date: Mar. 13, 2008

(87) PCT Pub. No.: WO2007/034146

PCT Pub. Date: Mar. 29, 2007

(65) Prior Publication Data

US 2008/0259489 A1  Oct. 23, 2008

Related U.S. Application Data

(60) Provisional application No. 60/718,729, filed on Sep. 21, 2005.

(51) Int. Cl.
G11B 5/596 (2006.01)
G11B 21/02 (2006.01)
G11B 5/09 (2006.01)
(52) U.S. Cl. .................... 360/77.08; 360/75; 360/51
(58) Field of Classification Search ................ None
See application file for complete search history.

(56) References Cited

U.S. PATENT DOCUMENTS

| 5,892,635 | A | 4/1999 | Morita |
| 6,366,419 | B1 | 4/2002 | Gaub |
| 6,507,450 | B1 | 1/2003 | Elliott |
| 2003/0086196 | A1* | 5/2003 | Morris et al. ............ 360/75 |
| 2004/0150906 | A1 | 8/2004 | Yoshimura |
| 2005/0243461 | A1* | 11/2005 | Kitamura et al. ...... 360/99.08 |
| 2007/0008643 | A1* | 1/2007 | Brady et al. ............. 360/75 |

OTHER PUBLICATIONS

International Search Report issued in PCT/GB2006/003414; Dec. 6, 2006, 2 pages.

* cited by examiner

*Primary Examiner* — Andrew L Sniezek
(74) *Attorney, Agent, or Firm* — Pillsbury Winthrop Shaw Pittman LLP

(57) ABSTRACT

A method of writing a servo pattern to a disk, wherein a servo pattern is generated in a processor. The generated servo pattern is then written to a disk. The servo pattern for a servo sector is preferably generated in a single routine.

24 Claims, 3 Drawing Sheets

APPARATUS AND METHOD FOR GENERATING A SERVO PATTERN

Figure 1:
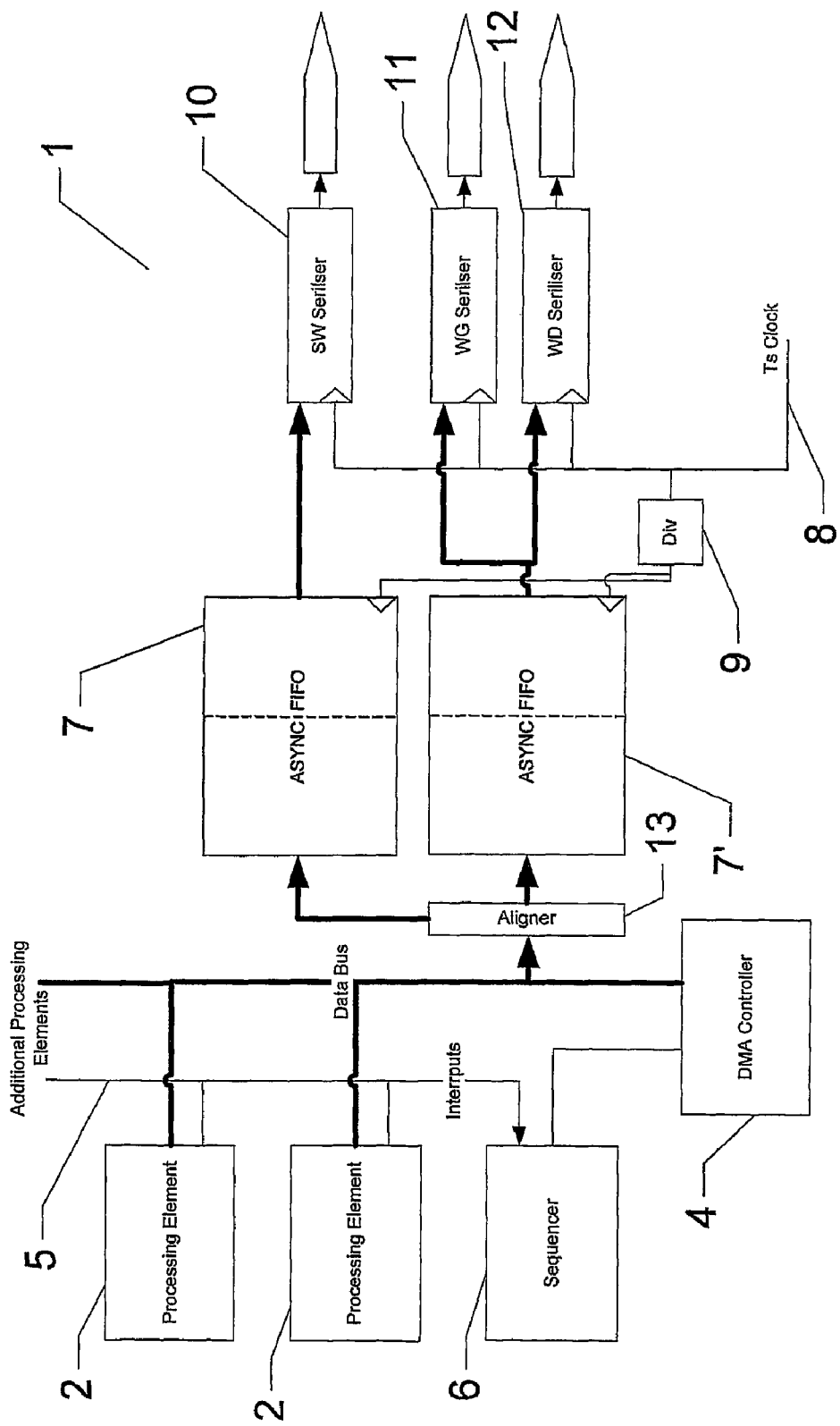

This application claims the benefit of priority to U.S. application Ser. No. 60/718,729, filed Sep. 21, 2005, the content of which is hereby incorporated by reference.

The present invention relates to a method and apparatus for generating a servo pattern and writing the servo pattern to a disk.

When a hard disk is manufactured, so-called servo tracks or patterns are written permanently to the disk. These servo tracks are in the form of bursts of data written at intervals circumferentially and radially across the whole of the data area of the disk. The servo tracks are used by the hard disk's read/write head (known as the product head) during normal use of the disk in order to allow the head to know its position over the disk. When operating, the hard disk can position the head on the disk and read back data in a closed loop using positional and timing information read from the disk itself. Servo patterns are typically written at equispaced circumferential positions with several hundred in the revolution. Importantly they must be written phase coherently with one another. This requirement is challenging and requires feedback from either a magnetic clock track or external encoding device as discussed further below.

In particular, traditionally, servo tracks have been written in the following way during manufacture. A head disk assembly, which comprises the hard disk, the product read/write head, motor, etc., is inserted into a servo track writer. The servo track writer has its own so-called clock head which is inserted into the head disk assembly to write a so-called clock track. This clock track is subsequently read back by the clock head to allow the angular position of the disk relative to the servo track writer to be known accurately at all times, so that the product head can write servo data at the desired locations.

So-called media writers operate similarly, by writing servo tracks simultaneously to plural disks before the disks are incorporated into a head disk assembly.

As an alternative, so-called self-servo writing systems are currently being developed. These avoid the need of a separate clock head, and instead use the product head to write its own clock data, interleaved with servo data, to create its own reference points as it writes the servo tracks across the disk. In another alternative arrangement, an external encoder, such as an optical encoder system, may be used in place of the clock track, again avoiding the need of a separate clock head.

The hard drive's own electronics are not traditionally capable of generating the servo patterns and in the case of media writers, in which the disks are written outside the drive, the hard drive's own electronics are not available for the task in any event. Therefore special electronics are required for the task of generating the servo patterns.

Traditionally servo patterns are constructed of three field types:
(i) Fixed frequency. This is used to lock the channel AGC (automatic gain control) and PLL (phase locked loop). There may be non-fixed frequency blocks used as synchronisation marks. These fields are common to most servo frames on most tracks.
(ii) Gray codes. These contain the track number and possibly the sector number encoded with a Gray code. They are typically laid out in such a fashion that some part updates on a track-to-track basis and some part is fixed on a track-to-track basis but changes on a sector-to-sector basis.
(iii) PES (position error signal) fields. These are blocks of fixed frequency pattern which are changed on a track-to-track basis, typically cycling though the pattern every 8 servo tracks.

Traditional STW schemes rely either on RAM-based architectures or custom hardware (which may be based upon reconfigurable logic).

For RAM-based architectures, it is impractical to store the whole pattern in RAM in the electronics due to the size of the pattern. However, traditional servo patterns have minimal differences from one track to another. An update on a track boundary consists of changing a few bits within the Gray code in the timing page and the timing page is changed to the next PES pattern. In a traditional concentric write operation, the pattern to be written is updated in the time during which the head positioner moves the heads to the next track, which is typically less than 3 ms. This has been traditionally adequate for the minor track-to-track changes. In more recent developments the pattern is written as a spiral and therefore has to be updated in the sector-to-sector gap, which is typically less than 10 μs. See for example U.S. Pat. No. 6,507,450.

This RAM-based architecture has become increasingly problematic as servo patterns have developed and become more sophisticated. In particular, Gray codes have become increasingly complex and their coding schemes mean that every sector on every track must be computed individually. This is achieved in one known servo pattern generator by using a soft-core processor with custom ALU (arithmetic logic unit) instructions to accelerate the process. The control buffer now has to hold information allowing different timing pages to be used at different sectors. In addition, there are now requirements to encode serial number information in place of servo sectors at certain tracks, which increases the complexity of the problem. See for example U.S. Pat. No. 6,366,419.

The greater use of multi-disk writers, i.e. so-called media writers, in recent years has placed additional demands on the system as a larger number of writing operations are interleaved, increasing the pattern density and complexity whilst reducing the inter-sector gaps where updates can be applied.

In order to accommodate the increasing complexity of patterns, the software associated with RAM-based architectures is also complex. The hard disk drive manufacturer typically describes the pattern in a proprietary description language, which is not straightforward and which requires support from the supplier of the servo track writer or media writer. A software layer is then required to interpret this language and build the RAM images, which are downloaded to the RAMs, and to calculate the updates and apply them at appropriate points. In addition, pattern development tools such as a visualisation software tool are expected by customers in order to assist with the writing of pattern descriptions.

The alternative, custom hardware architecture is to generate the pattern with custom hardware per pattern (which may be a custom FPGA load in the case of reconfigurable hardware). If the hardware is not reconfigurable, this places a very significant limitation on the flexibility of capital equipment required to manufacture hard disk. Solutions based upon reconfigurable logic do offer sufficient performance but the resource demands and high skill levels required to maintain and develop new patterns based on these architectures makes the solutions expensive in the lifetime of the servo track writer.

A requirement exists therefore for a dynamic pattern generation engine that can be controlled using a simple pattern description language and fixed hardware and that can meet the performance demands of modern servo patterns.

According to a first aspect of the present invention, there is provided a method of writing a servo pattern to a disk, the method comprising: generating a servo pattern in at least one processor; and, writing the generated servo pattern to a disk.

Thus, the present invention replaces the known RAM-based pattern generator discussed above with one or more processors that generate the pattern. The or each processor may be a standard "off-the-shelf" processor. The pattern can be easily generated using software such as an industry standard language, such as C (which is compiled as necessary). This use of software, such as an industry standard language, also allows the servo pattern to be easily modified by disk drive manufacturers according to their own specific requirements. Another advantage is that it is not necessary to provide any external RAM (though this may be provided for some purposes), which keeps down costs. As the preferred architecture relieves many tasks from the host level software, it offers a far superior architecture for spiral and other complex pattern writing, particularly if a mechanism is provided to allow the sequencer to control the positioning system directly, so freeing the host processor from all time-critical operations. This architecture also makes the hardware architecture completely flexible so new features can be accommodated easily without the hardware making assumptions about the pattern formation. This means that in general hardware changes will not be required when new pattern requirements arise. The preferred architecture also overcomes many of the difficulties of the old architecture because it only operates on the full rate stream at the last point in the scheme, as opposed to forming the stream at the full rate.

Whilst the preferred embodiments discussed below relate principally to generating and writing a servo pattern to a hard disk during manufacture of the hard disk, this technology is also applicable to other disk drive pattern writing scenarios, such as those used in head and disk testing.

In practice in a preferred embodiment, the servo pattern is generated sector-by-sector based upon the track number and sector number of the sector concerned.

Preferably, the servo pattern for a servo sector is generated in a single routine.

In an embodiment, the servo pattern is divided into fields, the processor or processors being arranged to generate the servo pattern by using different routines for different fields of the pattern.

In an embodiment, the processor is arranged generate a servo pattern having at least one field including one or more of an AGC field, address mark, Gray code data and position error signal data.

In one embodiment, the servo pattern is generated in a single processor. Clearly, this requires a sufficiently fast processor but is perhaps the simplest embodiment to implement in practice.

In a currently preferred embodiment, however, the servo pattern is generated in a plurality of processors. This embodiment can make use of slower and therefore less expensive and more easily available processors to generate the servo pattern. Each processor may use the same pattern generation code. In an embodiment where the servo pattern is divided into fields and the processors are arranged to generate the servo pattern by using different routines for different fields of the pattern, the different routines may be distributed amongst the different processors. For example, the first processor may generate the first field, the second processor may generate the second field, etc. In an embodiment, each processor generates the pattern for one respective sector at a time. In an embodiment, a first of the processors generates a first pattern and a second of the processors generates a second pattern, and the method comprises interleaving the first and second patterns to form the servo pattern. The processors may be partitioned to allow different pattern types to be written simultaneously or in quick succession.

According to a second aspect of the present invention, there is provided apparatus for generating a servo pattern for a disk, the apparatus comprising: at least one processor having code for generating a servo pattern; and, an output for passing the generated servo pattern to a head for writing the servo pattern to a disk.

Preferably the processor is arranged to generate the servo pattern for a servo sector in a single routine.

The servo pattern may be divided into fields, the processor or processors being arranged to generate the servo pattern by using different routines for different fields of the pattern.

The processor may be arranged generate a servo pattern having at least one field including one or more of an AGC field, address mark, Gray code data and position error signal data.

In one embodiment, the apparatus has a single said processor having code for generating the servo pattern.

In a currently preferred embodiment, however, the apparatus comprises plural processors having code for generating the servo pattern. Preferably each processor uses the same pattern generation code. In an embodiment, each processor is arranged to generate the pattern for one respective sector at a time. In an embodiment, a first of the processors is arranged to generate a first pattern and a second of the processors is arranged to generate a second pattern, and the apparatus comprises a controller arranged to interleave the first and second patterns to form the servo pattern. The apparatus preferably comprises a sequencer for controlling the outputs of the processors such that the servo pattern is output in the correct order.

In an embodiment, the apparatus comprises a memory arranged to receive and store data relating to a track number and a sector number for a servo pattern to be generated and arranged to pass said data to the processor.

In an embodiment, an alternative "divide-and-conquer" methodology is used. In this embodiment the servo pattern is divided into fields and different routines are responsible for different fields of the pattern. These routines can be run on a single processor or distributed amongst multiple processors.

In an embodiment, the apparatus comprises an output buffer memory arranged to receive the generated servo pattern from the processor. The output buffer memory may be dynamically configurable between LIFO (last in, first out) and FIFO (first in, first out) to allow a generated servo pattern to be reversed as it is output by the output memory buffer.

Figure 2:
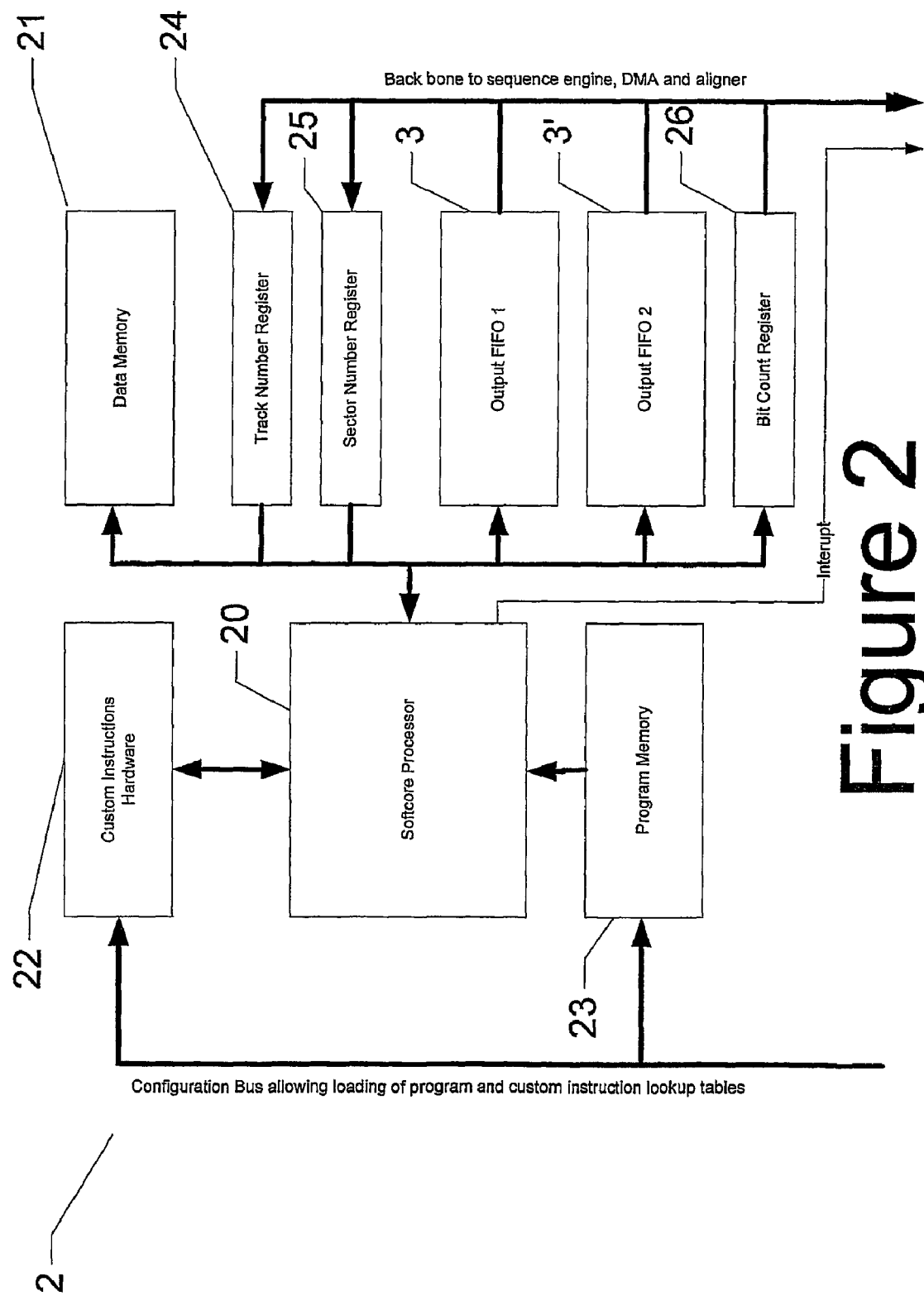
Figure 3:
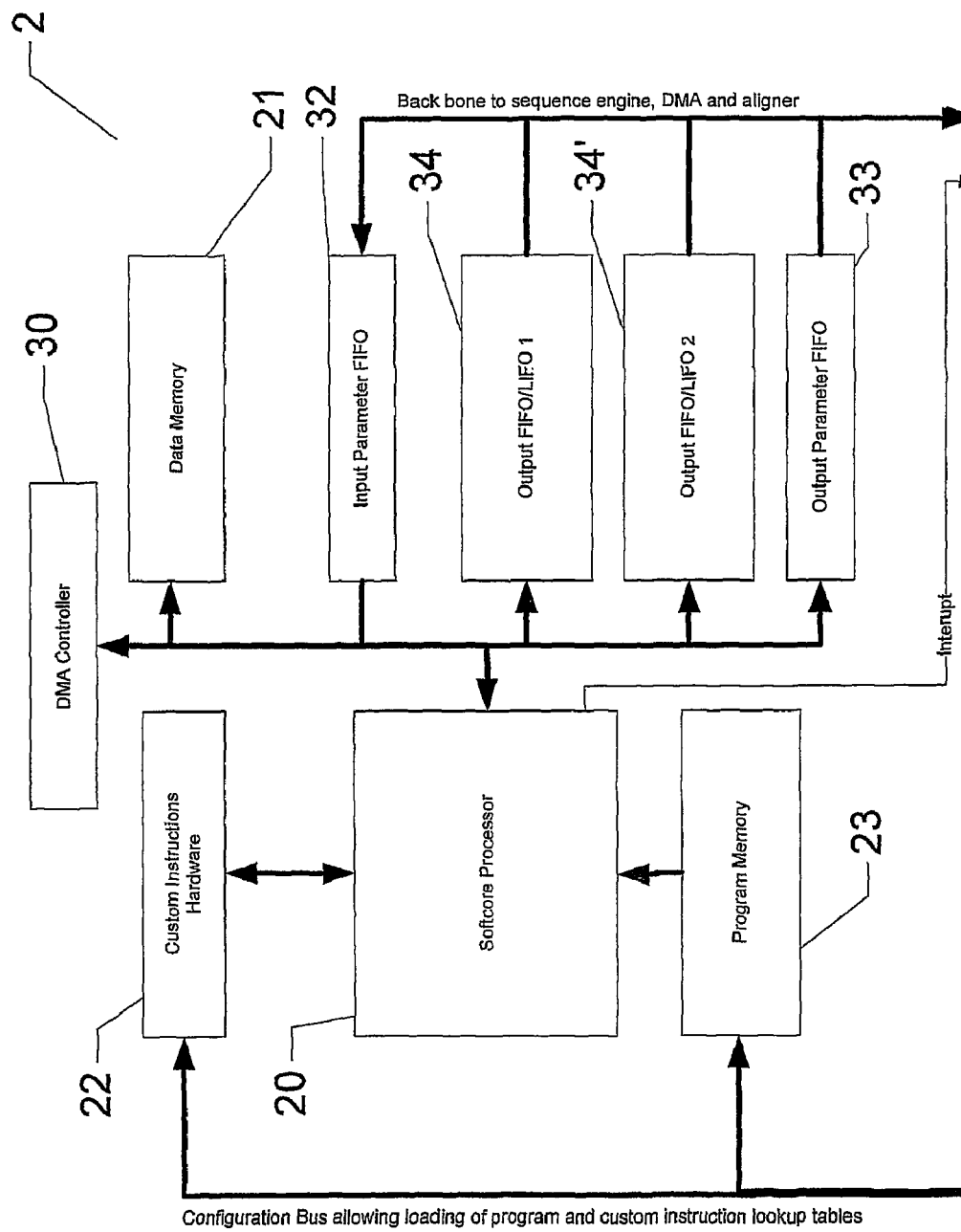

Embodiments of the present invention will now be described by way of example with reference to the accompanying drawings, in which:

FIG. 1 shows schematically the architecture of an example of a servo pattern generator according to an embodiment of the present invention in which a farm of processing elements are used;

FIG. 2 shows schematically a more detailed view of one of the processing elements of FIG. 1; and, FIG. 3 shows schematically the architecture of a second example of a servo pattern generator according to an embodiment of the present invention Referring to FIG. 1, the servo pattern generator 1 has a farm of processing elements 2. In this example, all of the processing elements 2 run the same code or routine to generate the servo sectors and put them into output FIFOs (first in, first out) 3,3' (see FIG. 2, discussed further below). A DMA (direct memory access) controller 4 is used to transfer data out of the FIFOs 3,3'. The processing elements 2 are connected via an interrupt line 5 to a sequencer 6 which is responsible for sequencing the farm of processing elements 2, providing them with the correct sector and track number. Each processing element 2 notifies the sequencer 6 via the interrupt 5 when it has completed generation of a servo pattern sector and stored the result in FIFO 3 (FIG. 2). It also notifies the sequencer 6 of the length of its sector. The sequencer 6 then provides the processing element 2 with the updated track and sector number and restarts it storing its result to an alternative FIFO 3' (FIG. 2). At the correct point, the sequencer 6 causes the DMA controller 4 to set up a DMA transfer to move the output data from the FIFO 3,3' of the processing element 2 to an aligner 13. The aligner 13 then forwards the data to a respective serialisation FIFO 7,7' having compensated for data widths.

It is desirable to run as much as the system as possible from a fixed clock as that simplifies the design of a stable digital logic system. The final serialisers 10,11,12 must run from the Ts clock 8, which is determined by customer requirements and the rotational speed of the disk being written. The Ts clock 8 will also be phase locked to the disk being written in order to compensate for mechanical phenomena including motor speed variation. In order for data to be loaded to the serialisers 10,11,12 at the correct rate, a divider 9 is used for the serialisation FIFOs 7,7', which manage the transfer of the data words to the respective final serialisers 10,11,12 to maintain a constant serialisation stream.

Of the many signals currently generated by known pattern generators, the only two that strictly speaking are actually required are Write Gate and Write Data which go directly to the preamp which controls the head writing. Write Gate activates the preamp in write mode and Write Data defines the polarity of the bit to be written. As the patterns are written overlapping radially, it is important to use both signals to form the servo pattern. Each processing element 2 is used in this embodiment to generate both the Write Gate and Write Data signals, which are sent to the write gate (WG) serialiser 11 and the write date (WD) serialiser 12 as appropriate.

In one preferred embodiment, the data is passed around as 32-bit words, 16 bits representing Write Data and 16 bits representing Write Gate. As the servo sectors may not be multiples of 16 in length, the aligner 13 is used to rearrange the data coming from the processing elements 2 to cope with the alignment of data on the transition from one sector to the next.

Whilst only two signals are required for the preamp to write the patterns, a further signal Sector Window or alternatively Sector Mark is required for debug and other operations such as generation of serial streams (though this task would ideally be carried out by the sequencer 6). However Sector Window or Sector Mark can be created by the aligner 13 in the process of merging the streams and the underlying pattern code does not need to be aware of its creation. In any event, the Sector Window or Sector Mark signal is sent to the sector window/sector mark (SW) serialiser 10 as appropriate.

If the data is being passed around in 16-bit words, the whole system theoretically needs to run no faster than one sixteenth of the Ts clock rate. However, in practice a small margin for overheads will also be required. Many of the current new families of high performance FPGAs have serialisers associated with each output pin that are designed to work in the way described above and are therefore suitable for use as the processing elements 2. However these high performance FPGAs with serialisers are not a prerequisite of the preferred embodiment so long as the FPGA fabric can support a serialiser at the Ts clock rate or an interface to an external serialiser. In practice the system should be clocked as fast as possible to minimise the number of processing elements that are required. For example a NIOSII soft-core processor from Altera is capable of operating at up to 100 MHz and would be capable of supporting Ts clock rates of 800 MHz assuming a 50% overhead. (A soft-core processor is one in which inter alia instructions can be loaded according to the particular task required.) The NIOSII processor typically occupies approximately 2000 FPGA macro cells. Current generation FPGA technology provides devices with over 180,000 macro cells so the farm of processing elements 2 discussed above is entirely possible.

It will be understood that processors other than FPGAs may be used for the processing elements 2, including for example ASICS (application-specific integrated circuits).

For simplicity the sequencer 6 may be implemented as another soft-core processor. However, its program code can remain fixed. Additionally, more complex patterns, such as one involving interleaving different servo patterns to produce a single pattern, can be managed by a custom sequencer 6 with a group of processing elements 2 running the code for one pattern and another group running the code for the other. The sequencer 6 manages the operation of putting the pieces of pattern into the correct sequence without either piece of pattern requiring knowledge of the other.

Referring to FIG. 2, the preferred processing elements 2 have soft-core processors 20 with their own data memory 21 and program memory 22. Each processing element 2 has instructions hardware 22 having the same custom ALU instructions, which is used to hardware accelerate the construction of the pattern, for example the Gray codes with any other appropriate operations. A track number register 24 and a sector number register 25 receive track number and sector number data respectively from the controller 4 which are provided to the processor 20 so that the correct servo pattern can be generated. Each processing element 2 has two output FIFOs 3,3'. At any particular time, one FIFO 3,3' is used for storing the servo sector under creation and the other FIFO 3',3 for the servo sector waiting to be transferred out. To accelerate the architecture, as typically there are long gaps with the write gate off and no write data between sectors, the controller 4 assumes this gap state if the output FIFO 3,3' becomes empty before the bit count produced by the processing element 2 and recorded in a bit count register 26 has expired.

The processing elements 2 can be enhanced in three ways for greater flexibility as shown in FIG. 3.

First, a DMA controller 30 to the processing element bus 31 allows the base sector to be calculated the first time and stored in the local data memory 21. In this case, the pattern generation code only provides updates and the rest of the servo pattern is streamed from the data memory 21 to the output FIFOs 3,3'.

Secondly, the track number and sector number registers 24,25 can be replaced with a FIFO 32. An arbitrary number of parameters up to the length of the input parameter FIFO 32 can be passed from the sequencer 6 to the processing element 2. These are interpreted based upon the software with no hardware assumptions made on their meaning. A similar principle is applied for passing data from the processing element 2 to the sequencer 6 via a corresponding output parameter FIFO 33.

Thirdly, as the output FIFOs 3,3' are never read from and written to simultaneously, they can be designed to be dynamically configured as LIFO (last in, first out) or FIFO 34,34'. When in LIFO mode, the sector will be reversed, which is useful or desirable in some circumstances. To reverse a sector in the prior art techniques discussed above currently requires different pattern code. In this embodiment, no change to the pattern code is required: only the sequencer 6 needs to know of the change.

As the custom instruction hardware 23 is only used for limited sections of the total processing time, this can be time-division multiplexed if required to save implementation resource.

An example of some C code to generate the servo sector data is given below.

```
typedef unsigned long ULONG;
typedef unsigned int USHORT;
typedef unsigned char UCHAR;
#define SECTORSIZE 64
USHORT usSector[SECTORSIZE];
ULONG ulOffset;
void Sector(int iTrack, int iSector);
void AppendBits(USHORT usWord, ULONG ulOffset);
void NiosGray(int iTrack, int iSector);
USHORT usMask[16] = {  0x0000, 0x8000, 0xC000, 0xE000,
                       0xF000, 0xF800, 0xFC00, 0xFE00,
                       0xFF00, 0xFF80, 0xFFC0, 0xFFE0,
                       0xFFF0, 0xFFF8, 0xFFFC, 0xFFFE };
void Sector(int iTrack, int iSector)
//     This function would be called by main to build data
//     for the required sector
{
    int i;
    USHORT usPreamble(0xAAAA);
    USHORT usPreambleLength(6);
    // clear sector data storage area
    ulOffset=0;
    for(int i=0; i<SECTORSIZE; i++)
        usSector[i]=0x0000;
    //Add preamble in 16 bit words....
    for(i = 0; i< usPreambleLength; i++)
        AppendBits(usPreamble, 16);
AppendBits(0x002A,6);
    // Now index bits
    if(iSector==0)
        AppendBits(0x00B3,8);
    else
        AppendBits(0x00B4,8);
    //Gray code
    NiosGray(iTrack,iSector);
    //Burst data
    switch(iTrack%4)
    {
        case 0:   AppendBits(0xAAAA,16);
                  AppendBits(0x000A,4);
                  AppendBits(0xAAAA,16);
                  AppendBits(0x000A,4);
                  break;
        case 1:   AppendBits(0x5555,16);
                  AppendBits(0x0005,4);
                  AppendBits(0xAAAA,16);
                  AppendBits(0x000A,4);
                  break;
        case 2:   AppendBits(0xAAAA,16);
                  AppendBits(0x000A,4);
                  AppendBits(0x5555,16);
                  AppendBits(0x0005,4);
                  break;
        case 3:   AppendBits(0x5555,16);
                  AppendBits(0x0005,4);
                  AppendBits(0x5555,16);
                  AppendBits(0x0005,4);
                  break;
void AppendBits(USHORT usWord, ULONG ulSize)
//     This function puts the data bits into the sector data
//     storage area
{
    USHORT usWordAdr = ulOffset/16;
    UCHAR ucBit = (ulOffset)%16;
USHORT usInsertWord =
(usSector[usWordAdr]&usMask[ucBit]) | (usWord<<ucBit)&0xFFFF;
    usSector[usWordAdr] = usInsertWord;
```

-continued

```
    if(ucBit+ulSize>16)
    {
        USHORT usInsertWord2 = (usWord<<(16-ucBit))&0xFFFF;
        usSector[usWordAddress+1] = usInsertWord2;
    }
    ulOffset+=ulSize;
}
void NiosGray(int iTrack, int iSector)
//     This function would normally invoke the hardware Gray
//     code generator.
//     A simple software equivalent is shown here:
{
USHORT usTrackBits(10);
USHORT usSectorBits(6);
AppendBits(iTrack (iTrack>>1),usTrackBits);
AppendBits(iSector (iSector>>1),usSectorBits);
}
```

Embodiments of the present invention have been described with particular reference to the examples illustrated. However, it will be appreciated that variations and modifications may be made to the examples described within the scope of the present invention.

The invention claimed is:

1. A method of writing a servo pattern to a disk, the method comprising:
    generating servo sector data for a servo pattern in at least one processor by executing pattern generation code in the at least one processor, wherein said generation of the servo sector data by the at least one processor is controlled by a sequencer;
    with the sequencer, causing the servo sector data to be passed in a correct order to an aligner together with information about a length of the servo sectors;
    with the aligner, aligning the servo sector data on a transition from one servo sector to the next servo sector in accordance with the information about the length of the servo sectors; and,
    forming a servo pattern from the aligned servo sector data and writing the servo pattern to a disk,
    wherein the servo pattern generated for at least one sector of the disk is written to the disk before the servo pattern for a further sector of the disk is generated.

2. A method according to claim 1, wherein the servo pattern for a servo sector is generated in a single routine.

3. A method according to claim 1, wherein the servo pattern is divided into fields, and comprising generating the servo pattern by using different routines for different fields of the pattern.

4. A method according to claim 1, wherein the generated servo pattern has at least one field including one or more of an AGC field, address mark, Gray code data and position error signal data.

5. A method according to claim 1, wherein the servo pattern is generated in a single processor.

6. A method according to claim 1, wherein the servo pattern is generated in a plurality of processors.

7. A method according to claim 6, wherein each processor uses the same pattern generation code.

8. A method according to claim 6, wherein each processor generates the pattern for one respective sector at a time.

9. A method according to claim 6, wherein a first of the processors generates a first pattern and a second of the processors generates a second pattern, and comprising interleaving the first and second patterns to form the servo pattern.

10. A method according to claim 1, wherein at least one processor is a soft core processor.

11. A method according to claim 1, comprising passing with the sequencer a track number and/or a sector number to a processor, the processor including said track number and/or sector number in the generated servo sector data.

12. Apparatus for generating a servo pattern for a disk, the apparatus comprising:

- at least one processor having pattern generation code for generating servo sector data for a servo pattern;
- a sequencer arranged to control said generation of the servo sector data by the at least one processor, and to pass the generated servo sector data in a correct order to an aligner together with information about a length of the servo sectors;
- an aligner arranged to align the servo sector data from one servo sector to the next servo sector in accordance with the information about the length of the servo sectors to form a servo pattern and,
- an output for passing the servo pattern to a head for writing the servo pattern to a disk,
- wherein the apparatus is configured to pass the servo pattern generated for at least one sector of said disk to the output for being written to said disk before the servo pattern for a further sector of said disk is generated.

13. Apparatus according to claim 12, wherein the processor is arranged to generate the servo pattern for a servo sector in a single routine.

14. Apparatus according to claim 12, wherein the servo pattern is divided into fields, the processor or processors being arranged to generate the servo pattern by using different routines for different fields of the pattern.

15. Apparatus according to claim 12, wherein the processor is arranged generate a servo pattern having at least one field including one or more of an AGC field, address mark, Gray code data and position error signal data.

16. Apparatus according to claim 12, wherein the apparatus has a single said processor having code for generating the servo pattern.

17. Apparatus according to claim 12, comprising plural processors having code for generating the servo pattern.

18. Apparatus according to claim 17, wherein each processor uses the same pattern generation code.

19. Apparatus according to claim 17, wherein each processor is arranged to generate the pattern for one respective sector at a time.

20. Apparatus according to claim 17, wherein a first of the processors is arranged to generate a first pattern and a second of the processors is arranged to generate a second pattern, and comprising a controller arranged to interleave the first and second patterns to form the servo pattern.

21. Apparatus according to claim 12, comprising a memory arranged to receive and store data relating to a track number and a sector number for a servo pattern to be generated and arranged to pass said data to the processor.

22. Apparatus according to claim 12, comprising an output buffer memory arranged to receive the generated servo pattern.

23. Apparatus according to claim 22, wherein the output buffer memory is dynamically configurable between LIFO (last in, first out) and FIFO (first in, first out) to allow a generated servo pattern to be reversed as it is output by the output memory buffer.

24. An apparatus according to claim 12, wherein at least one processor is a soft core processor.

* * * * *